United States Patent [19]

Gauthier et al.

[11] Patent Number: 5,130,842
[45] Date of Patent: Jul. 14, 1992

[54] METHOD FOR RAPID AND UNIFORM HEATING OF A TRANSPARENT AND/OR REFLECTING MULTILAYER OPTICAL SYSTEM WITH POLYMERIC SOLID ELECTROLYTE

[75] Inventors: Michel Gauthier, La Prairie, Canada; Philippe Ricoux, Oullins; Daniel Muller, Paul, both of France

[73] Assignee: Societe Nationale Elf Aquitaine, Courbevoie, France

[21] Appl. No.: 635,521

[22] PCT Filed: May 10, 1990

[86] PCT No.: PCT/FR90/00327

§ 371 Date: Feb. 21, 1991

§ 102(e) Date: Feb. 21, 1991

[87] PCT Pub. No.: WO90/13844

PCT Pub. Date: Nov. 15, 1990

[30] Foreign Application Priority Data

May 10, 1989 [FR] France .................... 89 06110

[51] Int. Cl.[5] ............................. G02F 1/01
[52] U.S. Cl. ......................... 359/265; 359/275; 359/270; 219/209
[58] Field of Search ............ 350/353, 355, 357; 252/62.2, 600; 359/265, 270, 273, 275, 271; 204/130, 1.11; 219/219, 209

[56] References Cited

U.S. PATENT DOCUMENTS

| 4,505,790 | 3/1985 | Mase et al. ............... 204/130 |
| 4,652,090 | 3/1987 | Uchikawa et al. ......... 350/357 |
| 4,699,471 | 10/1987 | Miyake et al. ............ 350/357 |
| 4,889,414 | 12/1989 | Rauh et al. ............... 350/357 |
| 4,960,323 | 10/1990 | Demiryont ............... 350/357 |
| 4,993,810 | 2/1991 | Demiryont ............... 350/357 |

FOREIGN PATENT DOCUMENTS

| 0108179 | 5/1984 | European Pat. Off. . |
| 2825390 | 12/1978 | Fed. Rep. of Germany ...... 350/357 |
| 2531300 | 2/1984 | France . |
| 2065027 | 6/1981 | United Kingdom . |
| 2164466 | 3/1986 | United Kingdom . |

OTHER PUBLICATIONS

Journal of Applied Physics, vol. 57, 57, No. 1 Jan. 1985, American Institute of Physics, (Woodbury, N.Y., US), M. Watanabe et al.: "Ionic Conductivity and Mobility in Network Polymers from Poly(Propylene Oxide) Containing Lithium Perchlorate" pp. 123–128.

Primary Examiner—Rolf Hille
Assistant Examiner—Tan Ho
Attorney, Agent, or Firm—Oblon, Spivak, McClelland, Maier & Neustadt

[57] ABSTRACT

The optical system, which is comprised of a thin layer of ion conducting, macromolecular material, or solid polymer electrolyte sandwiched between two electrodes presenting each a conducting deposition carried by a support plate such that at least one of the conductor depositions and the associated support plate are transparent, is heated by applying between the conductor depositions of said electrodes an electric voltage signal of which at least one portion includes an alternating component which has an amplitude between 0.05 and 100 volts and a frequency lower than 5 kHz and preferably between 2 and 2000 Hz so as to generate within said optical system an alternating ionic current susceptible of producing a heating of the ion conducting macromolecular material by Joule effect. The optical system to be heated, which may be an electrochromium device, may have particularly a glazing type structure or a mirror type structure.

31 Claims, 1 Drawing Sheet

METHOD FOR RAPID AND UNIFORM HEATING OF A TRANSPARENT AND/OR REFLECTING MULTILAYER OPTICAL SYSTEM WITH POLYMERIC SOLID ELECTROLYTE

FIELD OF THE INVENTION

The invention relates to a method for rapid and uniform heating of a transparent and/or reflecting multilayer optical system containing a polymeric solid electrolyte, the said system being in particular an electrochromic system.

BACKGROUND OF THE INVENTION

An electrochromic system with polymeric solid electrolyte generally comprises two electrodes between which is sandwiched a thin layer of an ion-conducting macromolecular material (polymeric solid electrolyte), especially a conductor of protons or of alkali metal ions, at least one of the said electrodes containing a material, called an electrochromic material, which is placed facing the layer of ion-conducting macromolecular material and in which the insertion or deinsertion of ions, especially protons or alkali metal ions, results in a change in the light absorption and/or reflection spectrum of the said material, these electrodes, on the one hand, being in direct contact with the layer of polymeric solid electrolyte to which they adhere strongly and, on the other hand, each comprising a currentconducting deposit which is in contact with one of the facing sides of two support plates situated on both sides of the said electrodes and at least one of which and the associated conducting deposit are transparent. In particular, each electrode comprises a transparent current-conducting deposit, for example a deposit based on mixed indium tin oxide, which is in contact with one of the facing sides of two plates made of an inorganic or organic transparent material such as glass or transparent plastic, which are situated on both sides of the said electrodes and are coupled to form a window-type structure.

When a suitable potential difference, generally lower than 5 volts, is established between the conducting deposits of the electrodes, the appearance of a permanent colouring of the electrochromic system is observed, and this system can again become colourless on the application of an electrical voltage, generally of opposite sign to that which produced the colouring.

An electrochromic system of the abovementioned type can be employed as a window with variable light transmission for domestic use or for motor vehicles or as a mirror or rear-view mirror with variable light reflection.

It is advantageous to be able to heat such a glazed surface uniformly, to permit demisting, defrosting and-/or a faster response of the colour change to the electrical voltage which is applied The use of an external source of heat for heating an electrochromic system of the abovementioned type does not allow the required result to be obtained because operating in this way results in the appearance of a temperature gradient inside the electrochromic system, due to the poor diffusion of heat in the multilayer structure forming the said system, and this is reflected in a nonhomogeneous operation of this system.

It has already been proposed, as described in reference GB-A-2,065,027, to perform the heating of a polymeric composition forming a thin layer and containing an ion-conducting macromolecular material consisting of a polyether coupled with an ionisable salt by relying on a heating technique using dielectric losses, which consists in subjecting the said composition to the action of electromagnetic waves of very high frequencies, namely frequencies of the order of $10^6$ to $10^8$ hertz.

Such a heating technique using dielectric losses is not suitable for heating an electrochromic system such as referred to above, which comprises a thin layer of an ion-conducting macromolecular material sandwiched between two structures with high electronic conduction, namely the electrodes of said system, because, apart from the difficulties linked with its implementation and the disadvantages which it entails for the environment owing to the use of electrical signals of very high frequency, this technique does not lend itself well to heating multilayer structures comprising a number of layers with high electronic conduction which are close to each other.

SUMMARY OF THE INVENTION

A method has now been found for rapid and uniform heating of an electrochromic system comprising at least one thin layer of an ion-conducting macromolecular material intercalated between two electrodes, forming two structures with high electronic conduction, so as to be in intimate contact with the said electrodes, which makes it possible to overcome the disadvantages of the heating methods employing an external source of heat or dielectric losses Such a method can be employed more generally for heating any transparent and/or reflecting multilayer optical system which comprises two electrodes between which is sandwiched a layer of an ion-conducting macromolecular material (polymeric solid electrolyte), especially a conductor of protons or alkali metal ions, and transparent in the thicknesses employed, these electrodes, on the one hand, being in direct contact with the layer of polymeric solid electrolyte to which they adhere strongly and, on the other hand, each comprising a current-conducting deposit which is in contact with one of the facing sides of two support plates situated on both sides of the said electrodes and at least one of which and the associated conducting deposit are transparent, the said optical system being in particular such that each electrode comprises a current-conducting transparent deposit, for example a deposit based on mixed indium tin oxide, which is in contact with one of the facing sides of two plates made of an inorganic or organic transparent material such as glass or transparent plastic, which are situated on both sides of the said electrodes and are coupled to form a window-type structure.

The method according to the invention is characterised in that between the conducting deposits of the electrodes of the optical system which are situated on both sides of the layer of ion-conducting macromolecular material, an electrical voltage signal is applied, at least part of which comprises an alternating component which has a frequency of less than 5 kHz and an amplitude, that is to say a difference between its maximum and mean values, of between 0.05 and 100 volts, so as to generate in the optical system an alternating ion current capable of producing a heating of the ion-conducting macromolecular material by Joule effect.

The frequency of the alternating component of the electrical voltage signal applied between the conducting deposits of the electrodes of the optical system is advantageously more particularly between 2 and 2000 Hz and preferably is between 10 and 500 Hz. In addition, the preferred values of the amplitude of the said alternating component are between 0.05 and 30 volts.

The alternating component of the electrical voltage signal employed according to the invention may be sinusoidal or nonsinusoidal and may be uninterrupted or noncontinuous.

This alternating component may consist especially of a sinusoidal electrical voltage of a frequency equal to 50 or 60 Hz, generated by the sinusoidal alternating voltage supplied by the electricity supply systems.

A person skilled in the art will be easily capable of adjusting the electrical power to be supplied to the terminals of the optical system, especially an electrochromic system, of the abovementioned type with a polymeric solid electrolyte, which it is desired to heat, to reach the desired temperature in a specified time by taking into account the size and the geometry of the said system to be heated, its heat capacity and its heat loss to the external environment.

In fact, the heat power dissipated in the polymeric solid electrolyte because of the alternating motion of the ions which it contains is of the formula $U_A^2/Ri$, $A$ being the effective value of the alternating component of the applied electrical voltage signal and Ri denoting the ion resistance of the layer of polymeric solid electrolyte of the optical system to be heated. This same ion resistance is given by the relationship $Ri = K \times t/S$, in which K is the ionic resistivity of the polymeric solid electrolyte and t and S denote the thickness and the surface area respectively of the layer of polymeric solid electrolyte of the optical system. The heat power dissipated in the layer of polymeric solid electrolyte is therefore of the form $U_A^2/Ri$ or $K \times U_A^2 \times S/t$.

The alternating voltage to be applied to the optical system in order to heat it with a given heat power is therefore proportionally lower the greater the surface area and the smaller the thickness of this system. Similarly, heating a set of n identical optical systems requires the application of an alternating voltage which is higher (coupled with a lower current) when these n systems are connected in series than when these n systems are connected in a parallel configuration.

When the optical system is being heated, the intensity of the alternating current which is generated within the ion-conducting macromolecular material as a result of the application of the electrical voltage signal with an alternating component between the conducting deposits of the electrodes of the said system tends to increase with temperature because of the decrease in the resistance of the ion-conducting material. If need be, the temperature within the said ion-conducting material can be monitored while the optical system is being heated, in order not to exceed a predetermined value, it being possible for the said monitoring to be carried out either by employing an electrical voltage signal whose alternating component has a constant effective value and by limiting the intensity of the alternating current generated and/or by keeping constant the intensity of the alternating current flowing in the ion-conducting material and by limiting the amplitude of the alternating component of the electrical voltage signal. These techniques of thermal control of the temperature of a conductor are well-known in the art and will not therefore be described in detail.

BRIEF DESCRIPTION OF THE DRAWINGS

A more complete appreciation of the invention and many of the attendant advantages thereof will be readily obtained as the same becomes better understood by references to the following detailed description when considered in connection with the accompanying drawings, wherein.

DESCRIPTION OF THE PREFERRED EMBODIMENTS

Figure 1:
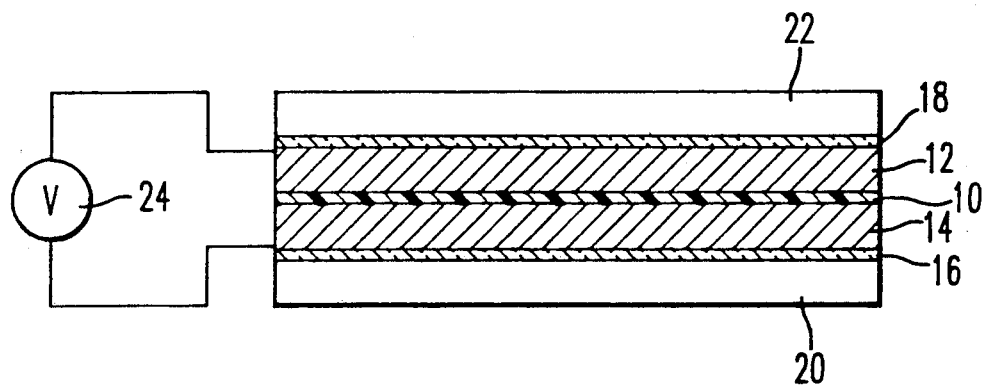
FIG. 1 is a fragmentary cross-sectional view of a multilayer optical system which is heated according to the method of the present invention.

With reference to FIG. 1, the optical system which is heated using the method according to the invention comprises a thin layer of an ion-conducting macromolecular material 10 (polymeric solid electrolyte) sandwiched between two electrodes 12, 14.

A "thin layer" of the ion-conducting macromolecular material 10 means that a layer of the said material whose thickness, which actually corresponds to the distance separating the two electrodes 12, 14 situated on both sides of the ion-conducting macromolecular material 10, low in relation to the areas of this macromolecular material which are in contact with the adjacent layers formed by the electrodes 12, 14. The thickness of the thin layer of the ion-conducting macromolecular material 10 is advantageously between 5 μm and 2000 μm, it being necessary for the said thickness to be as uniform as possible.

The ion-conducting macromolecular material 10 may be any one of the polymer-based materials capable of simultaneously exhibiting an ion conductivity of at least $10^{-7}$ siemens/cm at room temperature and an electron conductivity of less than than $10^{-10}$ siemens/cm.

The ion-conducting macromolecular material 10 may, in particular, consist of a solid solution of at least one ionisable salt, especially an alkali metal salt and in particular a lithium salt, in a plastic polymeric material made up at least partly of one or more polymers and/or copolymers of monomers containing at least one heteroatom, especially oxygen or nitrogen, capable of forming bonds of the donor/acceptor type with the cation of the ionisable salt, the said polymer(s) being chosen in particular from polyethers and especially from ethylene oxide or propylene oxide homopolymers (cf. EP-A-0,013,199). In the improvements made to the solid solutions of the abovementioned type the plastic polymeric material may consist in particular of a copolymer of ethylene oxide and of at least one other cyclic oxide, the said copolymer having either the structure of a random copolymer (U.S. Pat. No. 4,578,326) which may be optionally crosslinked (FR-A-2,570,224) or else the form of a network of the urethane type resulting from the reaction of a block copolymer of ethylene oxide and of at least one other cyclic oxide with a coupling agent consisting of an organic polyisocyanate (FR-A-2,485,274). In addition, the ionisable salts mentioned in reference EP-A-0,013,199 may be partly or wholly replaced by ionisable salts such as alkali metal closoboranes (FR-A2,523,770), alkali metal tetrakistrialkylsiloxyalanates (FR-A-2,527,611), bis(perhaloalkylsulphonyl)imides or alkali metal bis(perhaloacyl)imides (FR-A-2,527,602), alkali metal tetraalkynylborates or aluminates (FR-A2,527,610), alkali metal derivatives of perhaloalkylsulphonylmethane or perhaloacylmethane compounds (FR-A2,606,218) or else alkali metal salts of polyethoxylated anions (EP-A-0,213,985).

The ion-conducting macromolecular material 10 may further consist of a solid solution of an ionisable salt, for example a salt such as described in the abovementioned references, in a polymeric material consisting of an organometallic polymer in which at least two polyether chains are linked by a metal atom chosen from Al, Zn and Mg (FR-A-2,557,735) or from Si, Cd, B and Ti (FR-A-2,565,413) or else of a polymeric material consisting of a polyphosphazene carrying two polyether groups such as polyoxyethylene groups on each phosphorus atom.

The ion-conducting macromolecular material 10 can also be chosen from mixtures of polymers of polar nature and/or solvating with any salt, acid or base sufficiently dissociated in the polymer to obtain the appropriate ion conductivity or else from polymers carrying ionisable functional groups producing anions or cations attached to the macromolecular chains or else from protonic conductors such as those described in reference FR-A2,593,328 or mixtures of inert polymers with inorganic or organic ion-conducting materials dispersed in the polymeric matrix.

If need be, the ion-conducting polymeric material 10 may also contain one or more additives of a plasticising nature, especially one or more sulphones or sulphonamides such as tetraethylsulphonamide.

Figure 2:
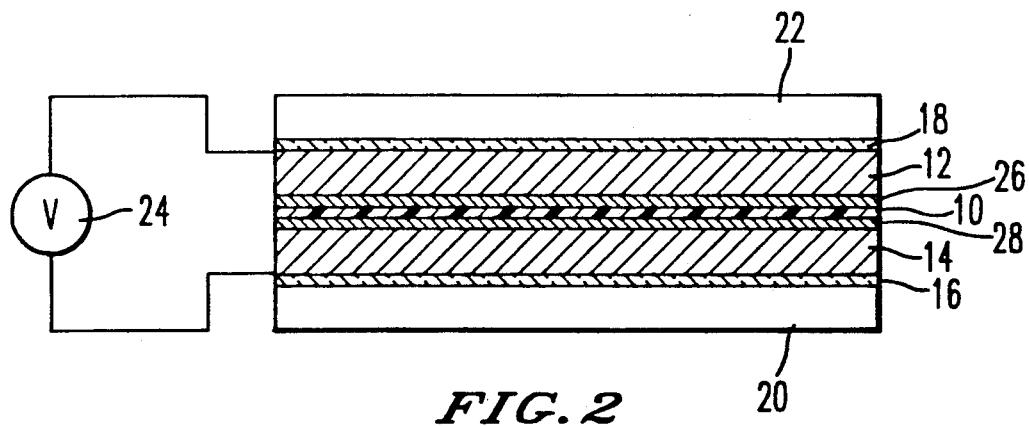
FIG. 2 is a fragmentary cross-sectional view of an electrochromic multilayer optical system which is heated according to the method of the present invention.

With reference to FIG. 2, when the optical system to be heated is an electrochromic system, at least one of the electrodes of the said system contains a material 26, 28, known as an electrochromic material, which is arranged in contact with the layer of polymeric solid electrolyte 10 and in which the insertion or the deinsertion of ions, especially alkali metal ions, in particular lithium, or of protons, results in a change in the light absorption and/or reflection spectrum of the said material. Such an electrochromic material 26, 28 may be especially based on a transition metal oxide or on a mixture or a solid solution of transition metal oxides, and in particular based on an oxide of a metal such as tungsten, molybdenum, vanadium or on a mixture or a solid solution of oxides of such metals. .

As for the transparent conducting deposit 16, 18 which at least one of the electrodes 12, 14 of the optical system comprises and which is in contact with the inner face of the corresponding support plate 20, 22 of the inorganic or organic transparent material, this is generally based on tin oxide and consists, for example, of mixed tin indium oxide or of tin cadmium oxide or else of tin oxide doped with antimony oxide or with fluorine.

When the optical system to be heated contains an electrode provided with a transparent conducting deposit and an electrode comprising a nontransparent conductor, the latter may be especially made of a current-conducting material capable of forming a reflecting layer and, for example, made of a metal such as Ag, Al, Ni,, Li, Cr or stainless steel. When one of the electrodes 12, 14 comprises a nontransparent current conductor, this conductor may take the form of a deposit on the associated support plate 20, 22 or may also consist of the said support plate 20, 22 , which is then chosen so that it will conduct. The conducting deposit may be produced on the appropriate face of the support plate 20, 22 by any method which is suitable for this purpose and especially by chemical or physical vacuum deposition.

The heating method according to the invention lends itself very well to the heating of an optical, especially electrochromic, system with polymeric solid electrolyte of the abovementioned type, since it permits rapid and uniform heating without altering in any way the transparency of the surfaces to be demisted or defrosted, and this is particularly useful for defrosting windows and/or rear-view mirrors of motor vehicles in wintertime. This is obviously not the case with the resistance heater wires printed at uniform intervals on the inner face of rear windows of motor vehicles which are currently being employed by most manufacturers and which cannot be employed for defrosting windscreens because of the interference with visibility due to the presence of these resistance wires.

When the optical system to be heated is an electrochromic system the alternating component of electrical voltage which is applied between the conducting deposits 16, 18 of the electrodes 12, 14 of the said electrochromic device, in order to heat this device, it can be coupled or otherwise to the electrical voltage 24 determining the colour of the electrochromic device.

When the optical device is being heated, the intensity of the alternating current generated within the polymeric solid electrolyte 10 by the application of the alternating voltage between the conducting deposits 16, 18 of the electrodes of the said device tends to increase because of the decrease in the resistance of the polymeric solid electrolyte If need be, the temperature during the heating can be controlled so as not to exceed a predetermined value, it being possible for this control to be carried out as indicated above by controlling the effective voltage and/or the current of the alternating signal.

The alternating voltage which can be employed for heating the optical system may be generated by any known alternating voltage source 24 capable of delivering an alternating electrical voltage in the shape of an uninterrupted signal or a noncontinuous signal exhibiting the frequency and amplitude characteristics defined above. This alternating voltage source 24 is connected to the conducting deposits 16, 18 the electrodes 12, 14 of the optical system to be heated. When the optical system is of the electrochromic system type the alternating voltage source 24 can be integrated into the system which controls the voltage for controlling the said electrochromic system.

The invention is illustrated by the following examples, which are given without any limitation being implied.

EXAMPLE 1

An electrochromic device was produced, comprising two windows, each with a thickness of 3 mm and each of whose facing sides served as a support for an electrode, the said electrodes consisting, one of a transparent ITO (indium tin oxides) deposit and the other of a transparent ITO deposit coated with a layer of $WO_3$ and both being separated by a 30-$\mu$m layer of a polymeric solid electrolyte to which they adhere strongly, the WO: layer capable of inserting lithium reversibly under the effect of an electrical field being facing the polymeric solid electrolyte. The said electrolyte consisted of a solid solution containing 7% by weight of $LiClO_4$ in a copolymer of ethylene oxide and butylene oxide, containing 70% by weight of ethylene oxide, this electrolyte being transparent to visible light and having an ionic conductivity, expressed in siemens/cm, ranging from $10^{-6}$ at 0° C. to $10^{-4}$ at 80° C.

When a direct voltage of 3 volts was applied between the conducting deposits of the electrodes of the electrochromic device thus produced, this device changed colour at 20° C. after a period of approximately 300 seconds.

This test was repeated by superposing onto the 3-volt direct voltage employed to control the colour change of the device, an alternating electrical voltage with an amplitude of 5 volts at a frequency of 50 Hz. A very rapid rise in the temperature of the electrochromic device was observed, its core reaching a temperature of approximately 60° C. after approximately 10 seconds and the change in the colour of the said device was produced after approximately 60 seconds. The kinetics of the heating phenomenon resulting from the application of the alternating voltage are substantially the same for a given alternating voltage, whatever the surface area of the device; only the distributed current and hence the power dissipated by a Joule effect varies proportionally to the said surface area.

EXAMPLE 2

A "triplex" device was produced, consisting of two glass panes, each 3 mm in thickness, bonded together with a transparent adhesive. Each of the facing sides of the two glass panes was coated with a conducting transparent deposit based on mixed indium tin oxide (ITO), the said deposits forming the electrodes of the device. The adhesive bonding the two glass panes together consisted of a polymeric solid electrolyte consisting of a solid solution containing 7% by weight of $LiClO_4$ in a polymeric matrix of polyetherurethane obtained by the action of an aliphatic triisocyanate on a random $\alpha,\omega$-dihydroxylated copolymer derived from ethylene oxide and butylene oxide.

The device thus produced formed a window whose surface area was 25 cm² and the thickness of the electrolyte adhesive was 50 μm.

When a sinusoidal alternating voltage which had an effective value of 10 volts was applied between the conducting deposits or electrodes of the said device and a frequency of 50 Hz an increase of 20° C. in the temperature of this device was observed after a few seconds.

We claim:

1. A method for rapid and uniform heating of a transparent and/or reflecting multilayer optical system, said system comprising two electrodes between which is sandwiched a thin layer of an ion-conducting macromolecular material of polymeric solid electrolyte, especially a conductor of protons or of alkali metal ions, which is transparent in the thicknesses employed, these electrodes, on the one hand, being in direct contact with the layer of polymeric solid electrolyte to which they adhere strongly and, on the other hand, each comprising a current-conducting deposit which is in contact with one of the facing sides of two support plates situated on both sides of the said electrodes and at least one of the plates and the associated conducting deposit are transparent, the method comprising the steps of: applying an electrical voltage signal between the conducting deposits of the electrodes of the optical system, at least a part of which comprises an alternating component which has a frequency of less than 5 kHz and an amplitude, that is to say a difference between its maximum and means values, between 0.05 and 100 volts, and generating in the optical system as a result of the applied voltage an alternating ion current capable of producing a heating of the ion-conducting macromolecular material by Joule effect.

2. The method according to claim 1, wherein the frequency of the alternating component of the electrical voltage signal applied between the conducting deposits of the electrodes of the optical system is between 2 and 2000 Hz and is preferably between 10 and 500 Hz.

3. The method according to claim 1 or 2, wherein the amplitude of the alternating component of the electrical voltage signal applied between the conducting deposits of the electrodes of the optical system is between 0.05 and 30 volts.

4. The method according to claim 1, wherein the alternating component of voltage is selected from the group consisting of an uninterrupted signal and a non-continuous signal.

5. The method according to claim 4, wherein the alternating component of voltage is a sinusoidal signal.

6. The method according to claim 1, wherein a temperature within the ion-conducting macromolecular material is monitored in order not to exceed a predetermined temperature, the said monitoring being carried out by at least one of employing an electrical voltage signal whose alternating component has a high constant effective value and by limiting the intensity of the alternating current generated, and keeping constant the intensity of the alternating current flowing in the ion-conducting material and by limiting the amplitude of the alternating component of the electrical voltage signal.

7. The method according to claim 1, wherein the thin layer of ion-conducting macromolecular material of the optical system has a thickness of between 5 μm and 2000 μm.

8. The method according to claim 1, wherein the ion-conducting macromolecular material has simultaneously an ionic conductivity of at least $10^{-7}$ siemens/cm at room temperature and an electronic conductivity of less than $10^{-10}$ siemens/cm.

9. The method according to claim 1, wherein the ion-conducting macromolecular material consists of a solid solution of at least one ionisable salt in a plastic polymeric material comprising at least one of one or more polymers and copolymers of monomers containing at least one heteroatom capable of forming bonds of the donor/acceptor type with the cation of the ionisable salt.

10. The method according to claim 9, wherein said at least one ionisable salt is an alkali metal salt.

11. The method according to claim 9, wherein said at least one ionisable salt is a lithium salt.

12. The method according to claim 9, wherein said at least one heteroatom is selected from the group consisting of oxygen and nitrogen.

13. The method according to claim 9, wherein said polymer(s) and copolymer(s) are polyethers.

14. The method according to claim 9, wherein said polymer(s) and copolymer(s) are selected from the group consisting of ethylene oxide homopolymers, propylene oxide homopolymers and copolymers of ethylene oxide and of at least one other cyclic ether.

15. The method according to claim 1, wherein the ion-conducting macromolecular material consists of a solid solution of an ionisable salt in a polymeric material chosen from organometallic polymers in which at least two polyether chains are linked by a metal atom selected from the group consisting of Al, Zn, Mg, Si, Cd, B and Ti or from polyphosphazenes carrying two polyether groups on each phosphorous atom.

16. The method according to claim 15, wherein said polymeric material is chosen from polyphosphazenes carrying two polyoxyethylene groups on each phosphorus atom.

17. The method according to claim 8, wherein the ion-conducting macromolecular material is chosen from mixtures of polymers of polar nature and/or solvating with any salt, acid or base sufficiently dissociated in the polymer to obtain the desired ion conductivity, the polymers carrying ionisable functional groups producing anions or cations attached to the macromolecular chains, polymeric protonic conductors and mixtures of inert polymers with inorganic or organic ion-conducting materials dispersed in the polymeric matrix.

18. The method according to claim 1, wherein the current-conducting transparent deposit which at least one of the electrodes of the optical system comprises is based on tin oxide.

19. The method according to claim 18, wherein the current-conducting transparent deposit which at least one of the electrodes of the optical system includes comprises a member selected from the group consisting of mixed tin indium oxide, mixed tin cadmium oxide, tin oxide doped with antimony oxide and tin oxide doped with fluorine.

20. The method according to claim 1, wherein the optical system to be heated is such that each of its electrodes is made up of a current-associated with each conducting deposit is made of an inorganic or organic transparent material, the said optical system forming a window-type structure.

21. The method according to claim 1, wherein the optical system to be heated is such that one of its electrodes is made up of a current-conducting transparent deposit, the associated support plate being made of an inorganic or organic transparent material, and the other electrode comprises a conductor made of a current-conducting material and capable of forming a reflecting surface.

22. The method according to claim 21, wherein said current-conducting material is a metal selected from the group consisting of Ag, Al, Ni, Li, Cr and stainless steel.

23. The method according to claim 1, wherein at least one of the electrodes of the optical system contains a material, called an electrochromic material, which is placed facing the layer of ion-conducting macromolecular material and in which the insertion or the deinsertion of ions results in a change in at least one of the light absorption and reflection spectrum of the said electrochromic material, the said optical system forming the electrochromic system.

24. The method according to claim 23, wherein the material whose at least one of light absorption and reflection spectrum changes owing to insertion or deinsertion of ions is based on a transition metal oxide or on a mixture or a solid solution of transition metal oxides.

25. The method according to claim 23 or 24, wherein an electrical voltage which is the resultant of the alternating component of heating voltage and of a voltage which has a value equal to the voltage for controlling the electrochromic system is applied between the conducting deposits of the electrochromic system.

26. The methods according to claim 25, wherein the said voltages are applied either simultaneously and separately or in the form of a single voltage resulting from the superposition of the said voltages.

27. The method according to claim 24, wherein the inserted or deinserted ions are selected from the group consisting of alkali metal ions and protons.

28. The method according to claim 23, wherein the electrochromic material inserts or deinserts ions selected from the group consisting of alkali metal ions and protons.

29. The method according to claim 25, wherein the electrochromic system to be heated is such that the current-conducting deposit which each of its electrodes comprises is transparent and that the support plate associated with each current-conducting deposit is made of an inorganic or organic transparent material, the said electrochromic system forming a window-type structure.

30. The method according to claim 23, wherein the electrochromic system to be heated is such that the conducting deposit which one of its electrodes comprises is transparent, the associated support plate being made of an inorganic or organic transparent material, and the current-conductor which the other electrode comprises is made of a current-conducting material capable of forming a reflecting surface.

31. The method according to claim 30, wherein said current-conducting material is a metal selected from the group consisting of Ag, Al, Ni, Li, Cr and stainless steel.

* * * * *

UNITED STATES PATENT AND TRADEMARK OFFICE
CERTIFICATE OF CORRECTION

PATENT NO. : 5,130,842
DATED : JULY 14, 1992
INVENTOR(S) : MICHEL GAUTHIER ET AL.

It is certified that error appears in the above-identified patent and that said Letters Patent is hereby corrected as shown below:

On the title page, Item [75] Inventors change the third inventor's city from "Paul" to --Pau--.

In the Abstract, line 16, change "electrochromium" to --electrochromic--.

In column 3, line 25, change "$U_A^2/Ri,_A$" to --$U_A^2/Ri,U_A$--.

In column 6, line 64, change "WO" to --$WO_3$--.

In column 8, line 42, change "claim 1" to --claim 8--;
  line 64, change "claim 1" to --claim 8--.

In column 9, line 31, change "current-associated" to --current-conducting transparent deposit and that the support plate associated--.

UNITED STATES PATENT AND TRADEMARK OFFICE
CERTIFICATE OF CORRECTION

PATENT NO. : 5,130,842

DATED : JULY 14, 1992

INVENTOR(S) : MICHEL GAUTHIER ET AL.

It is certified that error appears in the above-identified patent and that said Letters Patent is hereby corrected as shown below:

In column 10, line 29, change "claim 25" to --claim 23--.

Signed and Sealed this

Twelfth Day of October, 1993

Attest:

BRUCE LEHMAN

Attesting Officer

Commissioner of Patents and Trademarks